US005660623A

United States Patent [19]
Macpherson et al.

[11] Patent Number: 5,660,623
[45] Date of Patent: Aug. 26, 1997

[54] RESINATED PIGMENT COMPOSITIONS

[75] Inventors: Ian Alexander Macpherson, Paisley, Scotland; John Aldred Nimmo, Tonbridge, Great Britain; Brian Tuck, Kilmacolm, Scotland

[73] Assignee: Ciba-Geigy Corporation, Tarrytown, N.Y.

[21] Appl. No.: 396,044

[22] Filed: Feb. 28, 1995

[30] Foreign Application Priority Data

Mar. 4, 1994 [GB] United Kingdom ............ 9404158

[51] Int. Cl.⁶ .................................................. C08K 5/00
[52] U.S. Cl. ................................. 106/493; 106/500
[58] Field of Search .............................. 106/493, 500

[56] References Cited

U.S. PATENT DOCUMENTS

| 3,826,670 | 7/1974 | Rees | 428/402.34 |
| 4,793,863 | 12/1988 | Anantharaman et al. | 106/500 |
| 4,880,472 | 11/1989 | Bugnon et al. | 106/493 |
| 5,271,769 | 12/1993 | Bugnon et al. | 106/419 |

FOREIGN PATENT DOCUMENTS

| 0254861 | 2/1988 | European Pat. Off. |
| 0528601 | 2/1993 | European Pat. Off. |
| 950294 | 2/1964 | United Kingdom. |
| 2054629 | 2/1981 | United Kingdom. |

OTHER PUBLICATIONS

Hays, B.G.; "A Model for Organic Pigments in Oil or Water–Based Printing Inks", American Ink Maker, pp. 9–21 Oct. 1996.

Kirk–Othmer, Encyclopedia of Chemical Technology, vol. 20, pp. 107 (1982) (no month).

McKay et al., Dispersion of Powders in liquids, pp. 471–505, (1981) (no month).

McKay et al., Technological Applications of Dispersions, pp. 143–175, (1994) (no month).

Herbst et al., Industrial Organic Pigments, pp. 205–248 and pp. 326–332, (1993) (no month).

*Primary Examiner*—Mark L. Bell
*Assistant Examiner*—Scott L. Hertzog
*Attorney, Agent, or Firm*—Michele Kovaleski; Kevin T. Mansfield

[57] ABSTRACT

The present invention provides a method of reducing the tendency of a resinated pigment product to self-heat which comprises treating an aqueous slurry of the pigment with a compound of a multivalent metal or metalloid under conditions such as will precipitate an insoluble compound of the metal or metalloid on the pigment, and then isolating the treated pigment.

11 Claims, No Drawings

RESINATED PIGMENT COMPOSITIONS

The present invention relates to resinated pigments.

Many solid materials are unstable under certain conditions and may slowly decompose or oxidise. This can result in liberation of heat which in the case of materials having good insulating character and held in bulk may lead to significant temperature rise and in extreme cases spontaneous combustion. This occurs when the rate of heat production exceeds the rate of heat loss and autoignition temperature is reached. Such behaviour offers potentially dangerous situations during transportation or storage and special packaging precautions are required to be taken under specific legislation e.g. UN Class 4.2 (substances liable to spontaneous combustion) which specifies transportation criteria in terms of packaging volume and materials of fabrication of the packaging.

The present invention relates to a method for treatment of resinated pigments to reduce their liability to self heat and hence improve their safety in transportation, packaging and storage.

The technical requirement of pigments used in modern printing inks, particularly those used in lithographic processes, has led to development of resinated pigments. The incorporation of resin into the pigment has been found necessary to optimise and balance the properties of the pigment such as strength, ease of dispersion and transparency. In these pigments the mean particle size of the colour component needs to be very small, and as a consequence the resin, which is believed to coat the individual colour particles, has a high surface area and in the case of dry pigments is exposed to air. These products therefore are prone to autoxidation even at temperatures used in manufacture and storage. A result of this combination of instability in air and high surface area is that the products have a tendency to decompose slowly on storage which leads to self heating and eventually under special conditions may result in ignition.

We have now found that the tendency to self heat and spontaneously combust can be retarded or eliminated by treating the resinated pigment with a compound of a multivalent metal or metalloid optionally with co-use of a second agent which acts as a cross linking agent. These treated products are more stable thermally and as a consequence are safer in storage or during transportation.

Use of metal resinates such as those of calcium, zinc, barium, aluminium and zirconium prepared by precipitation of the resin onto the pigment using the metal salt is well known to those versed in the art as a means of improving the applicational properties of pigments with respect to their performance in inks, plastics or paints. This is referred to for example in U.S. Pat. No. 4,793,863. There is however no indication that the self heating character of the product shows any improvement as defined in the present invention.

British Patent 950,294 describes a process for improving the applicational properties of pigments by incorporating into the pigment product an insoluble resin salt of zirconium, titanium, aluminium or certain other specified metals. Improvements claimed to the pigment are primarily to the gloss, but also to migration resistance and other unspecified properties. Nowhere is it specified that an improvement to the thermal stability of the pigment in storage is achieved.

Surface treatment of organic pigments by compounds of Group IVa or IVb elements in order to improve their applicational properties has been described in a number of patents, for example U.S. Pat. No. 3,826,670. One property which this treatment is claimed to improve is the heat stability, that is the retention of strength or hue or some other property during use. This is in no way the same as reduction of the liability to self heat in storage which is the essence of our claim. A further description of surface treatment of pigments by compounds or Group IVa or IVb elements is found in EP 0528601 (U.S. Pat. No. 5,271,169). In this invention the treatment is claimed to improve the storage stability of pigments. Reference to the text and the examples in this patent defines improved storage stability as the retention of strength during storage and no reference is made to the self heating behaviour of the pigment. In contrast the present invention is concerned with improving the thermal stability of products with respect to a reduction or elimination of self heating of the product.

We have found that, surprisingly, the tendency to self heat of a resinated pigment product is reduced when an aqueous slurry of the pigment is treated with an compound of a multivalent metal or metalloid.

Accordingly the present invention provides a method of reducing the tendency of a resinated pigment product to self-heat which comprises treating an aqueous slurry of the pigment with a compound of a multivalent metal or metalloid under conditions such as will precipitate an insoluble compound of the metal or metalloid on the pigment, and then isolating the treated pigment.

Preferably the insoluble compound of the metal or metalloid precipitated on the pigment is an oxide or hydroxide.

The oxide or hydroxide of the multivalent metal or metalloid may be monomeric or may be a hydrated or polymeric species. Preferred compounds are those of aluminium or zinc, or compounds of the elements of Group IVa or IVb of the Periodic Table. The precipitated oxide or hydroxide may also be cross linked by subsequent reaction with a cross linking agent.

The compound of aluminium may be for example an aluminium salt such as aluminium nitrate, aluminium sulphate, sodium aluminium sulphate or ammonium aluminium sulphate and may also be a salt known to be partially hydrolysed in aqueous media for example aluminium chloride or aluminium acetate. The compound of aluminium may also be a aluminate such as sodium aluminate or potassium aluminate.

The compound of zinc may be for example zinc chloride, zinc nitrate or zinc sulphate.

The compound of the group IVa or IVb element may be a compound of formula.

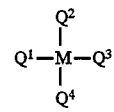

in partially or completely hydrolysed form, where M denotes a Group IVa or Group IVb element and $Q^1 Q^2$, $Q^3$ and $Q^4$ each independently denote halogen, $C_1$ to $C_4$ alkoxy, $C_6$–$C_{12}$ aryloxy or a group of formula II

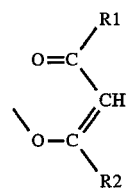

where R1 denotes methyl, ethyl, methoxy or ethoxy and R2 denotes methyl or ethyl. $Q^1$, $Q^2$, $Q^3$ and $Q^4$ may be the same or different. When one or more of $Q^1$, $Q^2$, $Q^3$ and $Q^4$ denote a $C_1$ to $C_4$ alkoxy group, this may be a methoxy, sec-butoxy or tert-butoxy group or, preferably, an ethoxy, n-propoxy, isopropoxy or n-butoxy group. When one or more of $Q^1$, $Q^2 Q^3$ and $Q^4$ denote halogen, this may be bromine, fluorine or, preferably, chlorine. When one or more of $Q^1$, $Q^2 Q^3$ and $Q^4$ denotes a $C_6$–$C_{12}$ aryloxy group, this may be phenoxy, optionally substituted by one to three alkyl groups having a total number of carbon atoms no greater than 6, or naphthyloxy.

In formula H, R1 and R2 preferably each denote methyl, i..e. formula II is preferably an acetylacetonate group.

In formula 1, M generally denotes tin, lead, germanium, silicon, titanium or zirconium. Thus, compounds of formula 1 include tin (IV) chloride ($SnCl_4$), tin (IV) dichlorodiacetylacetonate (i.e. $Q^1$ and $Q^2$ are each —Cl and $Q^3$ and $Q^4$ are each an acetylacetonate group), tetraethoxy silane, titanium (IV) n-butylate ($Ti(OCH_2$—$CH_2CH_2CH_3)_4$, titanium (IV) isopropylate, titanium (IV)-oxysulphate ($TiOSO_4$), zirconium (IV) propylate and zirconium (IV) acetylacetonate ($Q^1$, $Q^2$, $Q^3$ and $Q^4$ each denoting acetylacetonate).

Preferred compounds of formula 1 are those where M denotes silicon, titanium or zirconium, especially zirconium. The compound of the group IVa or IVb element may alternatively be a partially or completely hydrolysed acetate, nitrate, sulphate, chloride, carbonate or silicate of titanium (IV) or zirconium (IV). Aqueous solutions of compounds of zirconium (IV) such as zirconium acetate, also known as zirconyl acetate, zirconium nitrate, also known as zirconyl nitrate, and zirconium orthosulphate, also known as zirconyl sulphate, are believed to contain hydroxylated polymeric species. Preferred such hydrolysed titanium (IV) and zirconium (IV) compounds are hydrolysed titanium (IV) oxysulphate ($TiOSO_4$) zirconium (IV) oxychloride ($ZrOCl_2$) and, especially, zirconium (IV) acetate, zirconium (IV) orthosulphate and zirconium (IV) nitrate.

In a convenient procedure for treatment of resinated pigment particles with the compound of the multivalent metal or metalloid, a solution or dispersion of the compound is added to the pigment slurry at any stage during its manufacture. This may be either before or after addition of the resins and before or after any heat treatment or other modifying conditions. Preferably the compound is added after precipitation of resin onto the pigment surface. Alternatively an isolated resinated pigment, either as a wet presscake or a dry product, is redispersed in a liquid medium and then treated with a solution or dispersion of the compound of the multivalent metal or metalloid.

Thus the final product may have the insoluble compound of the metal or metalloid on top of the resin, or between the resin and pigment particles. Preferably it is on top of the resin which in turn is on the pigment particles.

The aqueous medium in which treatment of the pigment particles may be carried out can be acidic or alkaline, depending on the nature of the compound of the multivalent element. In order to achieve the required pH level to precipitate an insoluble compound, a water-soluble acid or base can be added to the aqueous medium. Suitable such bases are alkali metal hydroxides and carbonates, conveniently added as aqueous solution. Suitable acids include mineral acids such as hydrochloric and sulphuric acids, conveniently as dilute aqueous solutions. The temperature at which the treatment is carried out may vary over a wide range, and may be for example from ambient temperature up to boiling, preferably from 70°–95° C.

The compound of the multivalent metal or metalloid is used generally in an amount of 0.1% to 15% preferably 0.5 to 5%, calculated as the proportion of the element as its oxide in the pigment.

The multivalent metal or metalloid species on the pigment particles may be optionally cross linked by reaction with a cross linking agent. This reaction is conveniently carried out in the aqueous medium in which treatment of the pigment particles is affected before separation of the treated particles from the medium although it could be carried out by treating the pigment particles with the cross linking agent after such separation, for example in another solvent or mixture of solvents. It is believed that cross linking occurs through reaction of the agent with hydroxyl groups formed on hydrolysis of the compound of the multivalent metal or metalloid.

Suitable cross linking agents include boron oxyacids and their salts, for example boric acids such as orthoboric acid, metaboric acid and polyboric acids and their salts, usually alkali metal salts, and boronic acids, usually alkaneboronic acids such as methaneboronic and ethaneboronic acid, arylboronic acids such as phenylboronic acid, and their salts; aluminium salts such as aluminium nitrate, aluminium sulphate, sodium aluminium sulphate or potassium aluminium sulphate; phosphoric acids, such as orthophosphoric acid, and their salts, usually alkali metal salts; aliphatic and aromatic aldehydes such as formaldehyde, acetaldehyde, propionaldehyde, n-butyraldehyde, isobutyraldehyde, n-valeraldehyde, n-heptaldehyde, glyoxal, succinic dialdehyde, glutaric dialdehyde, adipic dialdehyde and benzaldehyde;carboxylic acids and their halides or salts, usually di acid halides of dicarboxylic acids such as oxalic acid, malonic acid, succinic acid, glutaric acid, adipic acid, tetrahydrophthalic acid, hexahydrophthalic acid and phthalic acid; alkylene dihalides, usually $C_1$ to $C_6$ alkalene such as methylene-, ethylene-, ethylidene-, trimethylene -, tetramethylene-, pentamethylene- and hexamethylene dihalides, usually dibromides or preferably, dichlorides; and polyisocyanates, usually disocyanates such as 1,2-propylene-, 1,4-butylene-, pentamethylene-, hexamethylene-, dodecamethylene-, 1,4-cyclohexylene-, and methyl-2-4-cyclohexylene diisocyanates, 3-isocyanatomethyl-3,5,5-trimethylcyclohexyl isocyanate (isophorone diisocyanate),2,4 and 2,6-tolylene diisocyanates and 4,4$^1$-diphenylmethanediisocyanate.

Other suitable cross linking agents are alkoxides of elements of Group IVa or Group IVb of the Periodic Table, usually tetra-alkoxides of tin, lead, germanium or, preferably, of silicon, titanium or zirconium in which the alkyl groups preferably each have 1 to 4 carbon atoms, for example as in methyl, sec-butyl or tert-butyl groups or, especially, ethyl, n-propyl or n-butyl groups, and inorganic compounds of tin, titanium and zirconium such as $ZrOCl_2$, $TiOSO_4$, and $SnCl_4$. In all cases the cross-linking agent is different from the compound used for the treatment of the resinated pigment.

Further suitable cross linking agents are silicates which form "active" silica or aluminates which form alumina. The formation of active silica from silicates is described in U.S. Pat. Nos. 3,370,971 and 3,639,133. Preferably, silicic acid, metasilicates or, particularly, commercial sodium silicate are used as the source of active silica. Suitable aluminates are water-soluble aluminates such as sodium, potassium and magnesium aluminates.

Also suitable as cross linking agents are alkoxysilyl-substituted alkyl esters of acrylic acid and methacrylic acid, usually trialkoxysilyl-substituted, $C_1$ to $C_6$ alkyl esters of acrylic or methacrylic acid in which the alkoxy groups preferably each have 1 to 4 carbon atoms, such as trimethoxysilylmethyl acrylate, 2-(trimethoxysilyl)ethyl methacrylate, 2-(triethoxysilyl) ethyl methacrylate and 3-(trimethoxysily)propyl methacrylate.

Preferred cross linking agents include boric acids and their salts, preferably sodium and potassium salts, especially orthoboric acid and sodium tetraborate; phosphoric acids and their salts, especially sodium orthophosphate; silicates, especially sodium silicate, together with an acid, preferably sulphuric acid; and trialkoxysilyl-substituted $C_1$ to $C_6$ alkyl esters of acrylic acid or methacrylic acid in which the alkoxy groups each have 1 to 4 carbon atoms, especially 3-(trimethoxysilyl)propyl methacrylate.

In a convenient method of effecting cross linking of the metal or metalloid species on the treated pigment, the cross linking agent or a solution thereof in water, a water-miscible organic solvent or mixture thereof is mixed with an aqueous dispersion of the treated pigment and, after cross linking, pigment particles having a cross linked treatment are separated from the resulting reaction mixture. The aqueous dispersion of the pigment to be cross linked is preferably that produced by mixing the compound of the multivalent metal or metalloid with an aqueous dispersion of the pigment as herein before described, i.e. cross linking is preferably effected in the aqueous medium in which initial treatment is carried out before the treated pigment particles are separated from the medium.

In general, the cross linking agent may be used in an amount of 0.01 to 1.5 mol, preferably 0.05 to 0.5 mol, per mol of compound of the multivalent metal or metalloid. When an active silica-forming or alumina-forming agent is used, it is added in an amount usually from 0.5 to 50, preferably 1 to 25, especially 2 to 15%, by weight of the pigment.

The aqueous medium in which cross linking is carried out usually has a pH of 3 to 10, more usually from 5 to 10. The pH is usually controlled by the addition of a water-soluble acid or base to the aqueous medium. Such acids include hydrochloric and acetic acids and bases include alkali metal hydroxides and carbonates, conveniently added as aqueous solutions. When an active silica-forming silicate is used as cross linking agent, the pH of the aqueous dispersion of coated pigment is usually adjusted to 7-10 by addition of a base and the silicate is added slowly together with hydrolysing acid, while the pH is maintained above 7.

The reaction mixture may be heated to effect to cross linking, for example to a temperature up to 95° C., preferably 60°-95° C. The cross linking reaction time may be, for example, from 0.1 to 8 hours, in general, reaction is sufficiently complete within 0.2 to 2 hours. The pigment particles having a cross linked treatment can be separated from the reaction mixture by filtration, washed, stored as presscake if desired and then dried to give a treated pigment powder.

In the method and composition of the invention, the pigment is resinated and may be, for example a phthalocyanine, a perinone, a quinacridone, an indanthrone, a flavanthrone, a pyranthrone, a perylene, a thioindigo, a dioxazine, an isoindoline, a diketopyrrolopyrrole, a basic dye complex, a metal complex, a monoazo pigment, an azo metal salt, or a disazo pigment. The invention is particularly useful where the pigment is a disazo pigment, for example a diarylide pigment of formula.

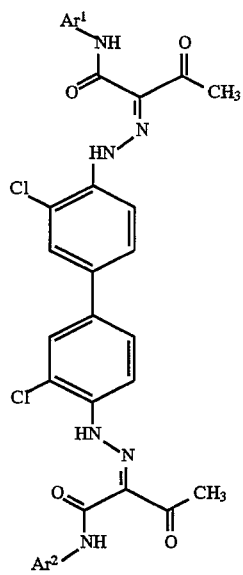

where $Ar^1$ and $Ar^2$ are the same or different and denote a phenyl group which may be optionally substituted by one to three substituents selected from halogen (preferably chlorine), methyl, methoxy. Such pigments include CI Pigments Yellow 12, Yellow 13, Yellow 14, Yellow 174, Yellow 176, Yellow 188.

The invention is also particularly useful where the pigment is a an azo metal salt, for example a salt of formula.

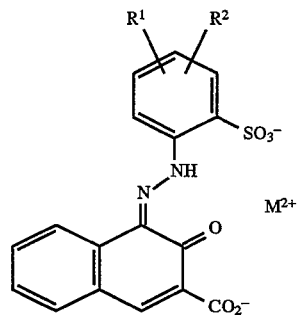

where $M^{2+}$ is a metal ion, preferably calcium, barium or strontium and R1 and R2 are same or different and may be hydrogen, chlorine or methyl. Such pigments include CI Pigments Red 57:1, Red 48:2, Red 53:1.

The pigment used in the process of the invention is resinated by a natural or synthetic resin by methods well known to those skilled in the art. Preferred resins are wood rosin or rosin which has been chemically modified by for example hydrogenation, disproportionation, polymerisation or by reaction with an organic reactant.

The proportion of resin to pigment used may vary over a wide range depending on the type of pigment product and may be from 1% to 60% by weight preferably 5-50% based on weight of pigment product.

Together with the resin other additives may be added to the pigment during this process. Examples of such additional additives include surfactants, long chain fatty acids, alcohols and amines. Surfactants used may be of the anionic type, such as fatty acid taurides, fatty acid N-methyltaurides, fatty acid isothionates, alkylbenzenesulphonates, alkylnaphthalenesulphonates, alkylphenol polyglycol ether sulphates and fatty alcohol polyglycol ether sulphates; fatty acids, such as palmitic, stearic and oleic acids; soaps such as alkali metal salts of fatty acids and naphthenic acids; cationic surfactants including quaternary ammonium salts, and N-oxides of tertiary amines or salts thereof; non-ionic surfactants including fatty alcohol polyglycol ethers (ethoxylated fatty alcohols), fatty acid polyglycol ester, alkylphenol polyglycol ethers and dialkyl polyglycol ethers. Alcohols may be long chain primary alcohols such as stearyl, oleyl or cetyl alcohols or mixtures of alcohols. Amines which may be added include long chain primary amines e.g. stearylamine; amine derivatives of wood rosin; N-long chain alkylalkylene diamines, polyamines, betaamines, polyamide/polyamine derivates of ethoxylated fatty amines and diamines, and derivatives of these compounds. Further examples of additives which may be added to the pigment are water soluble dyestuffs. In the case of azo pigments these may be azo compounds substituted by one or more water solubilising groups such as —$CO_2H$ or —$SO_3H$.

Reduction in tendency to self heat which can be achieved by the present invention is particularly useful for pigments to be used in surface coating compositions such as paints or printing inks or in high molecular weight materials.

As the pigment compositions obtained by the present invention have a reduced tendency to self-heat, they can be dried at higher temperatures than are normally used to dry pigments. This means that they can be dried quicker leading to an increased throughput.

The invention is illustrated by the following Examples, in which parts and percentages are by weight unless otherwise indicated.

EXAMPLE 1 a. Resinated Pigment Yellow 12 Slurry

A solution of 3.77 parts of acetoacetanilide in 36.5 parts of water containing 0.85 parts of sodium hydroxide is acidified by the addition over 15 minutes of a solution of 0.37 parts of acetic acid and 1.57 parts of concentrated hydrochloric acid in 5.0 parts of water. The resulting slurry is adjusted to a volume of 100 parts at pH 6.0 and a temperature of 15° by addition of ice and water. The acetoacetanilide slurry is then coupled over approximately one hour at pH 4.8–5.1 with a 10% solution of tetrazotised $3,3^1$-dichlorobenzidine (made by tetrazotising 2.61 parts of $3,3^1$-dichlorobenzidine in dilute hydrochloric acid with a slight excess of sodium nitrite) the pH being maintained by simultaneous addition of dilute sodium hydroxide solution. A solution of 3.0 parts of the potassium salt of disproportionated tall oil rosin and 0.75 parts of mixed cetyl and stearyl alcohols in 28.0 parts of water at 80° is then added to the slurry before the temperature of the slurry is raised to 70° and the pH adjusted to 5.5 by addition of dilute hydrochloric acid.

b. Stability Treatment.

To the slurry above is added a suspension of 1.04 parts of zirconium acetylacetonate in 7.0 parts of cold water. The temperature of the slurry is raised to 80° and held at this temperature before the pH is adjusted to 8.0 using dilute sodium hydroxide solution. A solution of 0.4 parts of borax in 6.0 parts of hot water is then added, the pH adjusted to 5.5 with dilute hydrochloric acid and the slurry held at 80° for a further hour before the product is collected, washed and dried.

EXAMPLE 2

A slurry of resinated Pigment Yellow 12 is made essentially as described in Example 1, Part a. A solution of zirconium acetate made by diluting 1.18 parts of a 50% solution of zirconium acetate with 4.0 parts of water is added and the mixture held at 80° for 30 minutes before the pH is raised to 8.0 by addition of dilute soldium hydroxide solution. To the slurry are then added 0.4 parts of borax dissolved in 6.0 parts of hot water and the pH adjusted to 5.5 by addition of dilute hydrochloric acid. The slurry is held at 80° C. for 30 minutes before the product is collected, washed and dried.

EXAMPLE 3

A product is made essentially as described in Example 2, except that after the addition of zirconium acetate solution and holding for 15 minutes at pH5.5, the product is collected, washed and dried.

EXAMPLE 4

A product is made essentially as described in Example 2 except that in place of borax an equivalent quantity of disodium hydrogen phosphate is used.

EXAMPLE 5

A product is made essentially as described in example 3 except that instead of zirconium acetate solution a solution of aluminium sulphate is used. The amount of aluminium sulphate used is calculated to be the quantity necessary to give the same proportion of aluminium oxide in the product as the proportion of zirconium oxide in Example 3.

EXAMPLE 6

Thermal storage stability of products of Example 1–5.

Assessment of the thermal storage stability is carried out by comparing the size of exotherm of products of the invention with the exotherms from untreated reference compounds. The assessment is carried out at an elevated temperature (140° C.) which results in acceleration of the decomposition and greater ease of measurement. Decompositions at elevated temperature may be related to temperatures more normally used for storage.

Fine mesh wire baskets made of stainless steel in the shape of cubes of nominal size 1000, 400 and 15.6 ml are packed with dry milled product with gentle tapping. A thermocouple is inserted into the middle of the pigment mass and the temperature displayed on a chart recorder. The baskets are placed in a thermostatic air oven held at 140° C. and the temperature recorded throughout a heating period of not less than eight hours. The recorded maximum temperature at the centre of the pigment masses are tabulated below. These indicate that the treated products (Example 1b, 2,3, 4,5) are more stable than the untreated product obtained by isolating the pigment product of Example 1a.

| PRODUCT OF | TREATMENT | EXOTHERM AT 140° C. (°c.) IN BASKET | | |
|---|---|---|---|---|
| | | 1000 ml | 400 ml | 15.6 ml |
| Example 1a | None | 115 | 115 | 8 |
| Example 1b | Zirconium acetylacetonate/borax | 0 | 0 | 3 |
| Example 2 | Zirconium acetate/borax | 10 | 5 | 0 |
| Example 3 | Zirconium acetate | 6 | 0 | 0 |

| PRODUCT OF | TREATMENT | EXOTHERM AT 140° C. (°c.) IN BASKET | | |
|---|---|---|---|---|
| | | 1000 ml | 400 ml | 15.6 ml |
| Example 4 | Zirconium acetate/disodium hydrogen phosphate | 8 | 2 | — |
| Example 5 | Aluminium sulphate | 12 | 6 | — |

EXAMPLE 7 a. Resinated Pigment Red 48:2 Slurry

A solution of 197.2 parts of 2-amino-4-chloro-5-methyl benzene sulphonic acid in 3000 parts of water containing 54 parts of ammonia solution (35% w/w $NH_3$) is stirred and acidified by addition of 228 parts of concentrated hydrochloric acid. After cooling to 5° by addition of ice, the resulting slurry is diazotised by addition of 62 parts of sodium nitrite. To this slurry is added 40 parts of calcium chloride and 3000 parts of water.

Separately 200 parts of 3-hydroxy-2-naphthoic acid are dissolved in 3000 parts of water containing 46 parts of sodium hydroxide. To the stirred solution is added a solution of 25 parts of Portuguese w/w gum rosin and 2.5 parts of 4-tert-butylcatechol dissolved in 500 parts of water containing 8.3 parts of potassium hydroxide, followed by 69 parts of potassium hydroxide in 200 parts of water.

The diazonium salt suspension prepared as described above is added to this solution over 15 minutes. After stirring for 30 minutes a solution of 36 parts of Portuguese w/w gum rosin in 500 parts of water and 12.5 parts of potassium hydroxide is added, followed by a solution of 125 parts of calcium chloride in 200 parts of water. The pH of the solution is lowered to 2.3 by addition of dilute hydrochloric acid, then the temperature raised to 80° C. and the pH adjusted to 6.0 by addition of ammonia.

b. Stability Treatment

To the stirred slurry above is added a solution of 52 parts of zirconium acetate solution (50% w/w) diluted with 200 parts of water, followed by addition of 17.6 parts of borax dissolved in 300 parts of hot water. The pigment product is filtered off, washed and dried at 60° C. before roasting at 90° C.

c. Thermal Stability

The thermal stability of the product from Step b above was compared using the method described in Example 6 with the thermal stability of a product obtained by isolation at the end of Step a. The results show the treated product has greater stability.

| PRODUCT OF | TREATMENT | EXOTHERM AT 140° C. (°c.) IN BASKET | |
|---|---|---|---|
| | | 1000 ml | 15.6 ml |
| Example 1a | None | 280 | 8 |
| Example 1b | Zirconium acetate/borax | 52 | 3 |

We claim:

1. A method of reducing the tendency of a resinated pigment product to self-heat which comprises treating an aqueous slurry of the pigment with a compound of a multivalent metal or metalloid under conditions which will precipitate an insoluble compound of the metal or metalloid on the pigment and crosslinking said compound on the pigment by reaction with a cross-linking agent therefore and then isolating the treated pigment.

2. A process as claimed in claim 1 in which the metal or metalloid is selected from aluminium, zinc, and elements from Group IVa or IVb of the Periodic Table.

3. A process as claimed in claim 2 in which the Group IVa or Group IVb element is selected from tin, silicon, titanium or zirconium.

4. A process as claimed in claim 1 in which the compound of a multivalent metal or metalloid is an acetate, nitrate, sulphate, chloride, carbonate or silicate, and is optionally partially or completely hydrolysed.

5. A process as claimed in claim 1 in which the compound of a multivalent metal or metalloid is a compound of the formula I

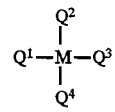

in partially or completely hydrolysed form, where M denotes a Group IVa or Group IVb element and $Q^1$, $Q^2$, $Q^3$ and $Q^4$ each independently denote halogen, $C_1$ to $C_4$ alkoxy, $C_6$ to $C_{12}$ aryloxy or a group of formula II,

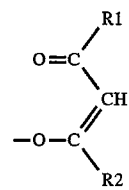

where $R_1$ denotes methyl, ethyl, methoxy or ethoxy, and $R_2$ denotes methyl or ethyl.

6. A process as claimed in claim 1 in which the compound of a multivalent metal or metalloid is added to a slurry of the pigment at any stage during its manufacture.

7. A process as claimed in claim 1 in which the compound of a multivalent metal or metalloid is added to a slurry of the pigment after precipitation of resin on to the pigment surface.

8. A process as claimed in claim 1 in which the treatment is carried out under conditions which lead to precipitation on the pigment of an insoluble compound of the metal or metalloid.

9. A process as claimed in claim 1 in which the cross-linking agent is a boric acid or salt thereof, a phosphoric acid or salt thereof, a silicate together with an acid, or a trialkoxysilyl-substituted $C_1$–$C_6$ alkyl ester of acrylic acid or methacrylic acid.

10. A process as claimed in claim 1 in which the pigment is resinated by a natural or synthetic resin.

11. A resinated pigment having a reduced tendency to self-heat made by a process as claimed in claim 1.

* * * * *